June 16, 1953     C. Y. STRONG     2,642,083
PRESETTING AND QUICK OPERATING VALVE REGULATOR CONTROL Filed Jan. 24, 1950     2 Sheets-Sheet 1

Cole Y. Strong
INVENTOR.

BY *Clarence A. O'Brien*
*and Harvey B. Jacobson*
Attorneys

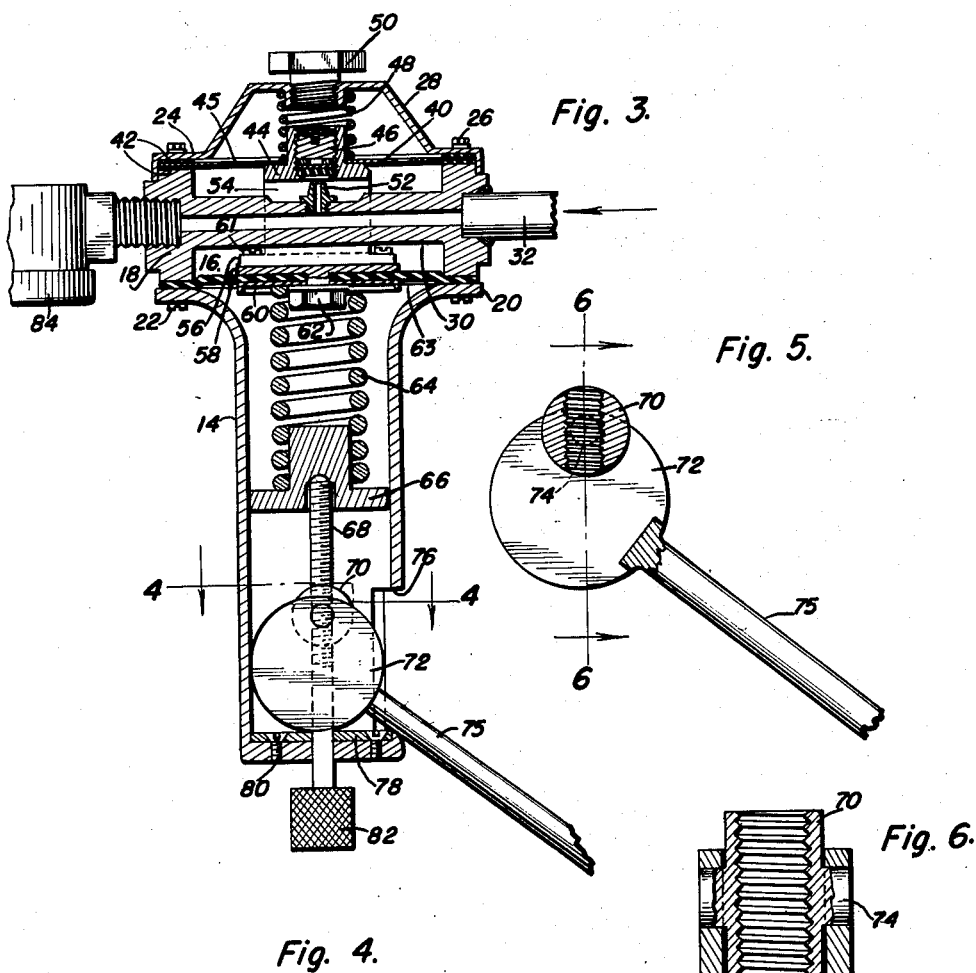

Patented June 16, 1953

2,642,083

UNITED STATES PATENT OFFICE 2,642,083

PRESETTING AND QUICK OPERATING VALVE REGULATOR CONTROL

Cole Y. Strong, Albuquerque, N. Mex.

Application January 24, 1950, Serial No. 140,247

6 Claims. (Cl. 137—495)

This invention relates generally to valves and more particularly to a quick operating metering valve assembly having means for opening and closing the valve by the actuation of a simple lever handle. A primary object of this invention is to provide a quick operating opening and closing means for any valve, particularly a metering valve in valves, and still more particularly a valve in which pressure within a valve casing is used for the direct means to close the valve so that an automatic metering of a fluid under pressure can be achieved in response to changes in pressure in apparatus connected to the outlets of said chamber, an example of such a valve construction being a pressure metering valve regulator device used to control the pressure of the gas fed to a cutting or welding torch. In such constructions, the valve is ordinarily opened and closed by turning a valve spindle by means of a small hand wheel, the spindle being threaded through the closure cap on the valve casing. According to this invention, such tedious turning of a hand wheel is obviated and a valve is opened to the preset degree of opening, by the simple throwing of a lever which actuates an eccentric connected with the valve operating spindle. Basic consideration determining the development of this invention is the saving of time in the operation of the valve and the nearly equally important saving of oxygen, acetylene or other gas.

It is an important object of this invention to provide for accurate pre-setting of the opening of the valve, this feature eliminating guesswork and inaccuracy in such work as mentioned above, inasmuch as the proper proportions of oxygen and acetylene are accurately and almost instantly obtained, whereas with the ordinary screw-in type of valve opening device, such accurate metering is difficult to obtain without a considerable loss of time at each opening of the valve.

A secondary object of this invention includes the provision of efficient means for mounting the actual valve member within the valve casing, the provision of a quick operating valve control in which the pre-setting of the opening of the valve is easily accomplished, and the provision of the various elements in forms making the original fabrication thereof a simple matter, and making the assembly as well as the replacement of these elements easily accomplished, the last feature mentioned relating particularly to the provison of a wear plate in easily replaceable form, for use with the eccentrics in the device.

And a last object to be mentioned specifically is to provide a device of this character which is relatively inexpensive and practicable to manufacture, which is safe, simple and convenient to use, which is extremely versatile and usable with many different types of valves, and which will give generally efficient and durable service.

With these objects definitely in view, this invention resides in certain novel features of construction, combination and arrangements of elements and portions as will be hereinafter described in detail in the specification, particularly pointed out in the appended claims, and illustrated in the accompanying drawings which form a material part of this application, and in which:

Figure 3 is a horizontal sectional view taken substantially on the line 3—3 in Figure 1;

Figure 4 is a vertical sectional view taken on the line 4—4 in Figure 3;

Figure 5 is another vertical sectional view of the parts hereinafter referred to as the eccentric disks, the handle carried thereby and the internally threaded nut which is mounted eccentrically to and between the disks.

Figure 6 is a horizontal sectional view of the structure shown in Figure 5; and

Similar characters of reference designate similar or identical elements and portions throughout the specification and throughout the different views of the drawings.

Figure 1:
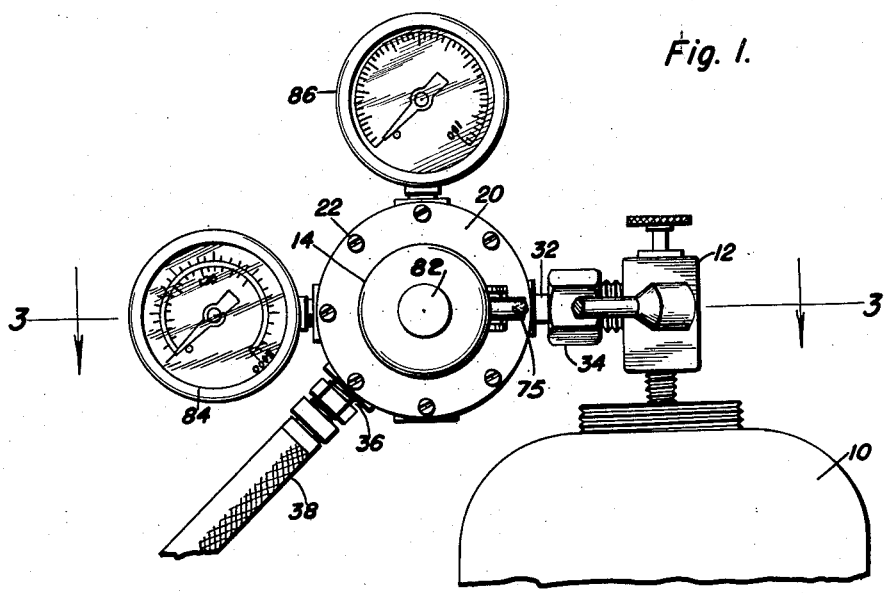
Figure 1 is a vertical side elevational view of this invention shown operatively connected to a tank of pressurized gas, the latter being shown fragmentarily, the handle of the device being broken away in part to show the connection of the device with the master valve of the pressure tank.
Figure 2:
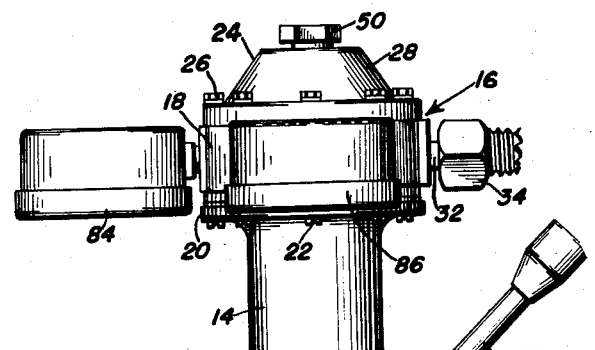
Figure 2 is a plan view of the device.
Figure 7:
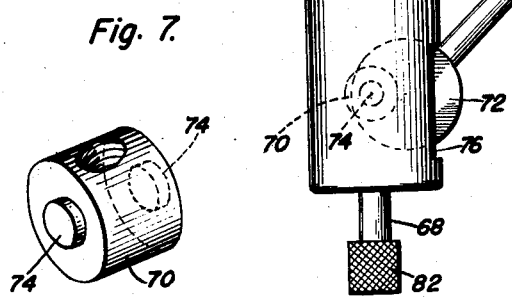
Figure 7 is a view of the nut, in perspective.

Referring now to the drawings in detail, the environment wherewith this invention is adapted to be used will ordinarily include a pressure tank or cylinder 10 which will ordinarily have a master valve assembly 12. At this point, it should again be stressed that the invention is not limited to use with valves having a pressure chamber as hereinafter described, although the presently described embodiment of the invention is a highly efficient and completely representative example of the structure and use of this invention.

In the valve assembly illustrated, a valve casing includes a hollow cylinder 14 and a pressure chamber 16 defined, in part, by a cylindrical wall 18 secured to outturned flange portions 20 of the hollow cylinder 14, as by means of studs 22. The other end of the pressure chamber 16 is closed by a cap 24 secured to the cylindrical wall 18 by studs 26, and it may be noted that this cap 24 will ordinarily have a cupped portion 28 extending outwardly on the side of the cap 24 remote from the cylinder 14. An inflexible tubular member 30, shown as formed integral with the cylindrical wall 18, extends diametrically across the pressure chamber 16 and communicates with the inlet 32. Connecting means, indicated at 34, will be provided to connect the inlet 32 with the master valve assembly 12. In the construction illustrated, the inlet 32 is a rigid tube capable of supporting the valve assembly. An outlet 36 provides communication between the pressure chamber 16 and a flexible hose 38, or the like, the form of which will be dictated by the environment wherewith the invention is used.

A resilient plate 40 is secured between the cylindrical wall 18 and the cap 24, this plate being suitably gasketed as indicated at 42 and having perforations therein as indicated at 45. A valve 44 is rigidly secured to the plate 40, the disclosed embodiment of the invention representing the plate 40 as being metallic and apertured centrally to receive the valve 44 which has a shank portion internally threaded to receive an adjustable valve insert 46, a coil spring 48 being compressed between the inner surface of the cupped portion 28 and the plate 40. A threaded plug 50 provides for access to the valve insert 46, while normally closing an access opening in the cupped portion 28 opposite to the valve insert 46.

The tubular member 30, which may be considered a portion of the inlet of the valve assembly, carries a simple valve seat 52 which may also be of the insert type and threaded into the tubular member 30, as clearly illustrated in Figure 3. The valve 44 has a saddle-like portion 54 which extends on either side of the tubular member 30 and terminates in a pair of flanges 56, one of which is illustrated in Figure 3, and washers 58 and 60, together with studs 61 and a central stud 62, are used to connect the flange structure 56 to a flexible diaphragm 63, this diaphragm separating the cylinder 14 from the pressure chamber 16 and the diaphragm is marginally secured between the outwardly turned flange portion 20 of the cylinder 14 and the cylindrical wall 18. It will be clear that this construction allows control of the movement of the valve 44 with relation to the valve seat 52 by controlling apparatus situated outside the pressure chamber 16, which apparatus will now be described in detail. A coiled spring 64 is compressed between the washer 60 and a spring guide 66 which is reciprocatively mounted within the hollow cylinder 14, and a threaded spindle 68 is adjustably mounted in a nut 70, this nut being secured to and between a pair of parallel coaxial disks 72, by means of trunnions 74 on the sides of the nut 70 journaled in central bearings in the disks 72. The nut, so-called because it has a threaded bore, is mounted eccentrically of the disks 72. A handle 75 is used to impart an over-center action to the disks 72 and is rigidly secured to the disks so as to hold the disks in parallel relation, and the handle 75 extends through an aperture 76 provided in the side of the hollow cylinder 14 whereby actuation of the handle serves to hold the valve in open or closed position. A friction plate 78 is removably secured by means of screws 80 on the inner surface of the end wall of the cylinder 14 and the disks 72 are urged into frictional engagement with this plate 78 by the action of the spring 64. The spindle 68 is provided with a thumb nut 82 whereby the opening of the valve 44 can be preset as desired.

Pressure meters 84 and 86 are mounted on the wall 18 to communicate with the tubular member 30 and the pressure chamber 16 to provide readings of the inlet and outlet pressures.

The operation of this invention will be clearly understood from a consideration of the foregoing description of the mechanical details taken in connection with the above recited objects and the drawings. Further description would appear unnecessary.

Having described the invention, what is claimed as new is:

1. A quick operating metering valve assembly comprising a valve casing, an inlet and an outlet in said casing, a valve controlling said inlet, an eccentric mounted on said casing and having a handle extending to the exterior of the casing, and means operatively connecting said eccentric with the valve, said eccentric having an over-center action and being adapted to hold said valve in one position after the handle has been shifted to a corresponding position, said means being adjustable for presetting the valve opening and including a spindle adjustable with reference to and shifted by said eccentric to move the valve in one direction, and a spring mounted with reference to said valve to bias the valve in the opposite direction, said eccentric comprising a pair of parallel coaxial disks secured to said handle, a nut mounted to and between said disks for rotation about an axis transversely and eccentrically disposed with reference to said disks, said spindle being threaded into said nut, said disks bearing against a portion of said casing so that said nut and spindle are urged alternatively in two directions, and a yieldable connection between said spindle and said valve.

2. A valve assembly according to claim 1 and wherein said casing includes a hollow cylinder, said yieldable connection comprising a coiled spring, a spring guide arranged coaxially of and for reciprocation within said cylinder, said spring being compressed between a portion of said valve and said spring guide, and said spindle engaging said spring guide.

3. A quick operating fluid pressure metering valve assembly comprising a valve casing including a pressure chamber having an inlet and an outlet and a hollow cylinder, a flexible fluid-tight diaphragm separating the hollow cylinder from the pressure chamber, a valve controlling said inlet and having a portion extending through said diaphragm, an eccentric operatively mounted on said cylinder and having a handle extending to the exterior of the cylinder, and means operatively connecting said portion of the valve with said eccentric, said eccentric having an over-center action and being adapted to hold the valve in open position when the handle is shifted to a corresponding position, and a spring biasing said valve into closed position, said eccentric comprising a pair of parallel coaxial disks secured to said handle and a nut mounted to and between the disks for rotation about an axis transversely and eccentrically related to said disks, and said means comprising a spindle carried by said nut and operatively engaging said portion of the valve.

4. A valve assembly according to claim 3 and wherein said spindle is threaded into said nut and has a part extending exteriorly of the cylinder to provide for pre-setting of the valve opening.

5. A valve assembly according to claim 4 and wherein said means includes a spring guide reciprocatively mounted in said cylinder, said spindle engaging said guide, and a coiled spring compressed between said guide and said portion of the valve.

6. A valve assembly according to claim 3 and wherein said cylinder has a replaceable end plate, and said disks frictionally contacting said plate.

COLE Y. STRONG.

References Cited in the file of this patent

UNITED STATES PATENTS

| Number | Name | Date |
|---|---|---|
| 200,416 | Waddell | Feb. 19, 1878 |
| 609,629 | Robinson | Aug. 23, 1898 |
| 620,122 | Gustafson | Feb. 28, 1899 |
| 780,929 | Angehr | Jan. 24, 1905 |
| 1,324,083 | Tolman | Dec. 9, 1919 |
| 1,324,084 | Tolman | Dec. 9, 1919 |
| 1,701,217 | Shoenbucher | Feb. 5, 1929 |
| 1,770,192 | Bennett | July 8, 1930 |
| 2,082,223 | Smith | June 1, 1937 |
| 2,094,222 | Smith | Sept. 28, 1937 |